(12) United States Patent
Li

(10) Patent No.: US 6,847,311 B2
(45) Date of Patent: Jan. 25, 2005

(54) METHOD AND APPARATUS FOR CHARACTER ENTRY IN A WIRELESS COMMUNICATION DEVICE

(75) Inventor: Xin-Tian Li, Grayslake, IL (US)

(73) Assignee: Motorola Inc., Schaumburg, IL (US)

(*) Notice: Subject to any disclaimer, the term of this patent is extended or adjusted under 35 U.S.C. 154(b) by 470 days.

(21) Appl. No.: 10/108,407

(22) Filed: Mar. 28, 2002

(65) Prior Publication Data

US 2003/0184451 A1 Oct. 2, 2003

(51) Int. Cl.[7] .................. H03K 17/94; H03M 11/00
(52) U.S. Cl. .................. 341/28; 341/22; 345/171; 400/110
(58) Field of Search ............ 341/22, 28; 400/110; 379/93.19, 93.27; 345/168, 171

(56) References Cited

U.S. PATENT DOCUMENTS

| 4,872,196 A | | 10/1989 | Royer et al. | |
| 5,128,672 A | | 7/1992 | Kaehler | |
| 5,164,900 A | | 11/1992 | Bernath | |
| 6,005,498 A | | 12/1999 | Yang et al. | |
| 6,009,444 A | * | 12/1999 | Chen | 715/535 |
| 6,046,732 A | * | 4/2000 | Nishimoto | 345/168 |
| 6,307,541 B1 | * | 10/2001 | Ho et al. | 345/171 |

FOREIGN PATENT DOCUMENTS

EP 0 930760 7/1999

* cited by examiner

*Primary Examiner*—Timothy Edwards, Jr.
(74) *Attorney, Agent, or Firm*—Roland K. Bowler, II; David S. Noskowicz (57) ABSTRACT

A method and apparatus for character entry and more particularly Chinese character entry. The method improves the ease of entry for Chinese characters on a device that has a keypad arrangement of at least a 3×3 matrix (106). For example wireless communication devices such as radiotelephones have a keypad (108) for dialing phone numbers. Arranging the Chinese characters on the device display in a 3×3 matrix to match the at least 3×3 matrix of the keypad allows the user to quickly select from the pin yin list (104) the key on the keypad that corresponds to the desired character in the matching matrix.

31 Claims, 6 Drawing Sheets

METHOD AND APPARATUS FOR CHARACTER ENTRY IN A WIRELESS COMMUNICATION DEVICE

FIELD OF THE INVENTION

The current invention relates generally to entering characters into an electronic device using a keypad, and more particularly to entering Chinese characters using a telephone keypad.

BACKGROUND OF THE INVENTION

A portable handheld communication device, such as a cellular radiotelephone, generally has few keys available for the entry of information such as short messaging or email text. A typical keypad used with a handheld wireless communication device is a standard telephone keypad having ten number keys, a star (*) key, and a pound (#) key. For English and many other alphabet languages, the numeric keypad of the telephone is overlaid with an alphabet keypad where three or more letters of the alphabet are associated with each number key. For example, the five (5) key is associated with the letters j-k-l. In some reduced keypad electronic devices, upon entering an alphabet entry mode, a user employs multiple key presses to enter letters to make words and names for use by features such short messaging and address book.

For example, once in alphabet entry mode, a user can employ one keypress to select the first letter associated with a depressed key, two keypresses of the same key to select the second letter associated with the key, three keypresses of the same key to select the third letter associated with the key, and so on.

Chinese and other character-based languages such as Japanese kanji, however, do not have a manageable number of alphabet letters that can be overlaid onto a numeric keypad. For example, Chinese does not use an alphabet and instead has about 5000 to 7000 commonly used characters. Advantageously, many phonetic systems have been developed to standardize the pronunciation of, for example, Mandarin Chinese. Several of these phonetic systems use the roman alphabet as phonetic symbols, such as the Wade-Giles and the pin yin systems for Mandarin Chinese, and other phonetic systems use a unique phonetic symbol set, such as the zhuyin system for Mandarin Chinese which has a 37-symbol phonetic alphabet. Cantonese Chinese also has a phonetic system using the roman alphabet.

Although there are over 5000 commonly used Chinese characters, there are only approximately 400 basic phonetic syllables in Mandarin Chinese speech. Thus, many different Chinese characters use the same Mandarin Chinese phonetic syllable. An extreme example is the Mandarin Chinese pin yin word "yi"; this phonetic syllable represents over 100 different Chinese characters, each with a different meaning.

Additionally, Mandarin Chinese uses four standard tones to differentiate meanings. Thus, the same phonetic syllable, when pronounced using a different tone, has a different meaning. Using the phonetic word "yi" as an example, at least 20 characters use the first tone, at least 31 characters use the second tone, at least 16 characters use the third tone, and at least 63 characters use the fourth tone.

Although there exist various methods of entering Chinese characters into a computer system using a full-sized keyboard having keys corresponding to all of the phonetic symbols of one of the various phonetic systems and the four tones, there is a need for a reduced keypad entry method for characters for use in a portable hand-held device such as a cellular radiotelephone.

Accordingly, a system is needed to improve the esthetics and protect the user interface. Providing a means to allow the device functionality to increase yet maintain esthetically pleasing surface to the user and protect the interface form inadvertent subjection to the environment is needed.

DETAILED DESCRIPTION OF INVENTION

The keypad entry method and apparatus to enter language notation for entry of words such as Chinese characters using a small number of keypresses on a reduced keypad is disclosed, where multiple characters are associated with a combination of alphanumeric symbols or character strokes. The user enters a symbol by pressing keys on a keypad the proper number of times to obtain the desired symbol on a screen. This symbol may be a stroke associated with a final desired character or an alphanumeric symbol or symbols associated with a set of symbols. A list of common sets of symbols associated with the Chinese language is called a pin yin list. As the user enters additional symbols to complete a word or character, the method and apparatus displays characters associated with the symbols in a three by three (3×3) matrix. The 3×3 matrix presented on the display corresponds or maps to the keypad on the device and allows the user to select the desired character by pressing the mapped key of the keypad that corresponds the quadrant of the matrix with the desired character. The keypad entry method and apparatus allows a Chinese character to be efficiently entered using a keypad.

Figure 1:
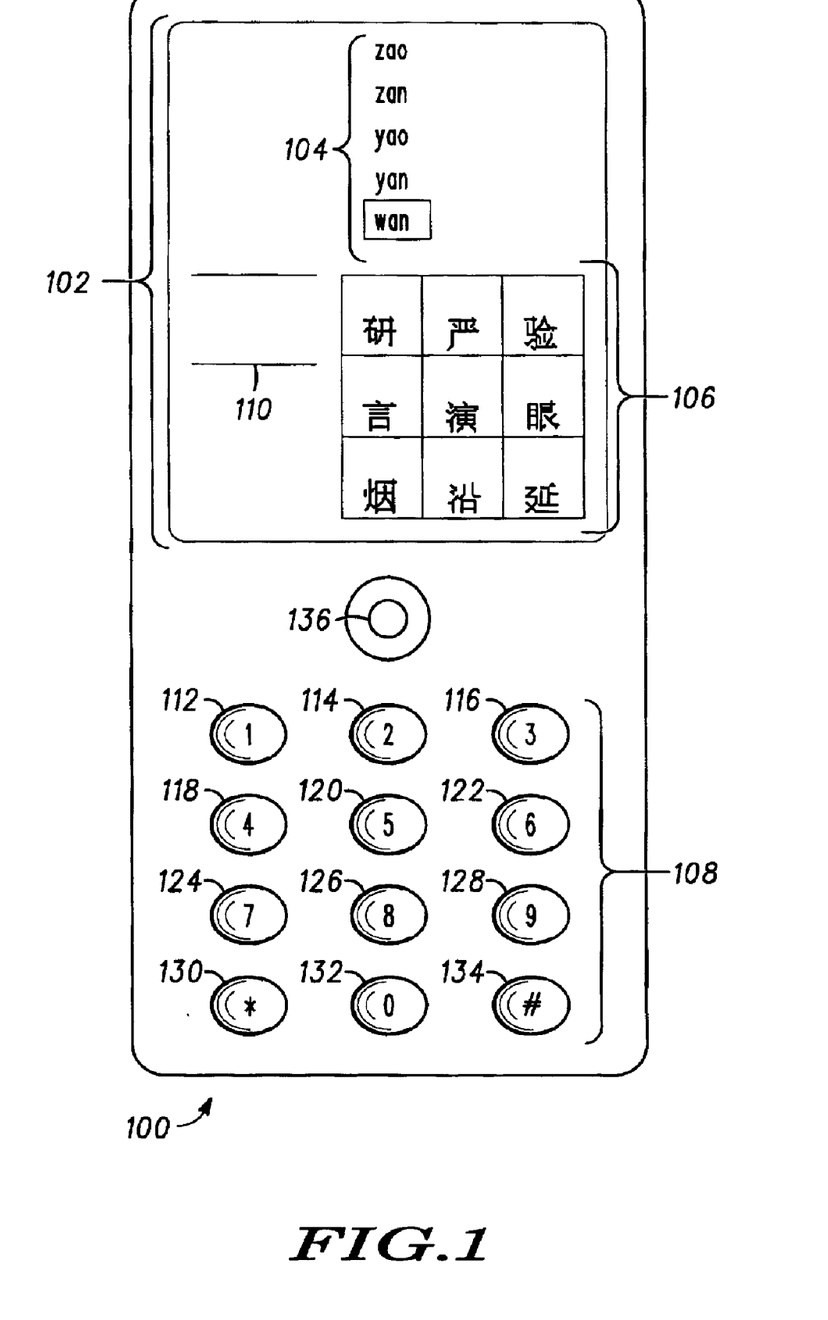
FIG. 1 is an exemplary view of a data entry device.

FIG. 1 shows a handheld data entry device 100 comprising a display 102, a pin yin list 104, a 3×3 character display matrix 106, a keypad 108, and a Text Display area 110. The handheld data entry device 100, may be a wireless communication device such as a cell phone or PDA with or with out wireless connectivity, so long as the device is used to entry Character type information and more particularly Chinese characters. This is particularly useful with limited keypads, or reduced entry keypads on smaller devices having limited data entry capability such as cell phones that are used to send SMS, EMS, or MMS messages.

Figure 2:
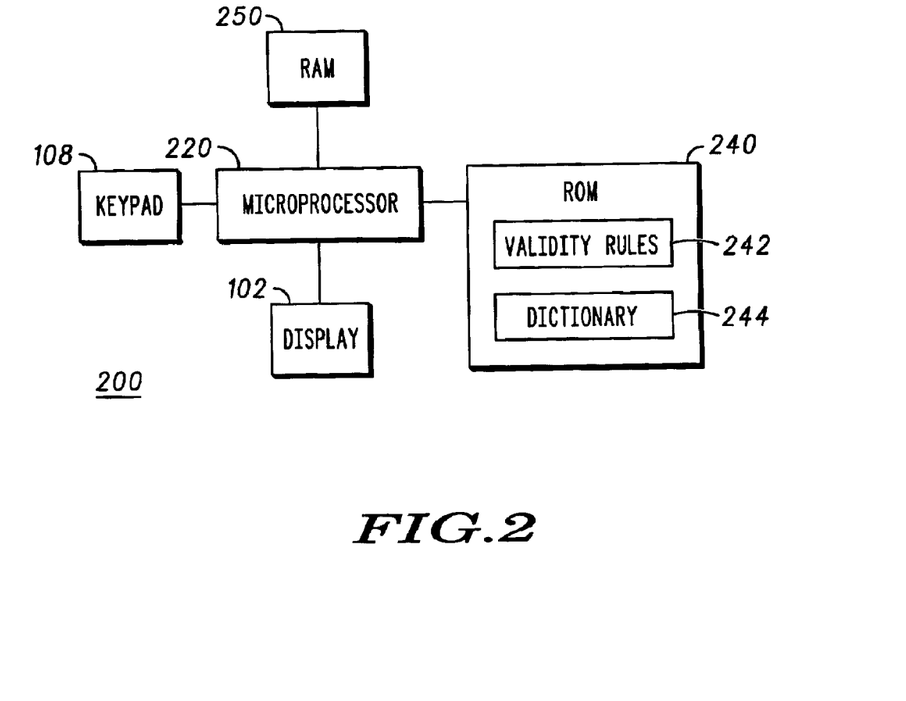
FIG. 2 is an exemplary block diagram of the internal circuitry of a data entry device.

FIG. 2 shows a block diagram of the internal circuitry of a reduced keypad entry apparatus 200 according to a preferred embodiment. The reduced keypad entry apparatus shown is implemented in a cellular telephone, however, it may also be implemented in a standard wired telephone, a personal digital assistant, a facsimile machine, a pager, an electronic label maker, or other electronic devices with reduced keypads, which have fewer keys than alphabet symbols. A keypad 108 and a display 102 are coupled to a microprocessor 220, which takes input from the keypad 108 and also transmits output to the display 102. A memory 240, such as a read-only memory (ROM) is also coupled to the microprocessor 220. This memory 240 is preferably an electrically-erasable read-only memory (EEPROM) holding two separate blocks of information: validity rules 242 and a dictionary 244. Another memory 250, preferably a random-access memory (RAM) is coupled to the microprocessor 220 for storing letters as they are entered via the keypad, a temporary list of Chinese characters associated with an entered phonetic syllable, stored short messages, and address book information.

Figure 3:
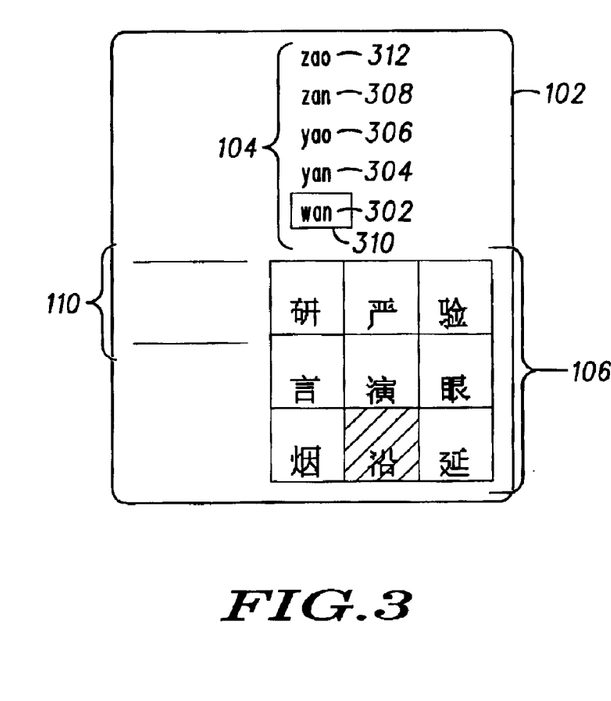
FIG. 3 is an enlarged exemplary view of a display.

FIG. 3 shows an enlarged view of the display 102 and a Chinese character pin yin list 104 according to a preferred embodiment. The Wade-Giles and pin yin phonetic systems both use the roman alphabet as phonetic symbols for the Mandarin Chinese language. Other language systems using the roman alphabet can also be implemented using the keypad 102. In the embodiment shown, the pin yin system will be used for Chinese character entry.

The keypad 108 has twelve standard keys 112–134 marked 0–9, *, and #. The keys 112–134 labeled 2–9 are also labeled with symbols corresponding to letters of the roman alphabet as dictated by the International Telecommunication Union-Telecommunication Standardization Sector (ITU-T) standard.

Number keys 112–134 labeled 2–9 can be used to select one of three or four letters of the roman alphabet. In one, embodiment, the device data entry mode is a "pin yin entry" method. One option for letter selection during pin yin entry mode, is to select a roman letter by the number of times a single key is pressed in succession. For example, pressing the five (5) key 120 once, results in a letter j on the display 102, pressing it twice results in a letter k on the display 102, and pressing it three times results in a letter l on the display 102. Pressing the five (5) key 120 additional times cycles through the j-k-l-1 letters again. Other methods of selecting a roman letters using the numeric keypad can be substituted for the method described. For example, another letter entry system uses the star (*) key 130 to scroll through the letters associated with a single number key: 5* produces a letter j on the screen, 5* * produces a letter k on the screen, and 5* * * produces a letter l on the screen.

The validity rules 242 in memory 240 shown in FIG. 2 stores in a table which roman letters can be a first letter of a pin yin word and the frequency of each valid first letter. When a key is pressed, the microprocessor 220 orders the presentation of valid first letters on the display 102 according to the validity rules 242. For example, the two (2) key 312 is associated with the roman letters a, b, and c. There are 5 pin yin words that start with the letter a, 16 pin yin words that start with the letter b, and 35 pin yin words that start with the letter c. Because the letter c is the most common first letter associated with the two (2) key 312, the letter c is presented on the display 102 when a user presses the two (2) key 312 once. Pressing the two (2) key 312 a second time presents a letter b on the display 102, and pressing it a third time presents a letter a on the display 102. Pressing the two (2) key 312 additional times scrolls through the letters c-b-a.

The presentation of other roman letters associated with a single key may also be reordered in light of their frequency of occurrence as a first letter of a pin yin word. In the preferred embodiment, the letters associated with the seven (7) key 124 are presented in the order s-p-q-r and the letters associated with the nine (9) key 128 are presented in the order z-y-w-x while the letters associated with the remainder of the number keys are presented in their standard alphabetical order. Also, certain roman letters never begin a pin yin word in Mandarin Chinese. For example, the letters i, u, and v do not begin any pin yin words and thus are not displayed by the microprocessor 220 when a first letter of a word is being entered. This validity and presentation order information is preferably stored in the ROM 240 shown in FIG. 2 in the validity rules 242 memory.

Once a first letter is selected and exhibited on the display 102, the user presses a different key to start cycling through next letters, or the user presses the pound (#) key 134 to indicate that the desired letter has been entered and then enters an additional letter. Pressing the pound (#) key 134 is necessary in situations where consecutive letters in a pin yin word are both associated with the same number key. For example, the consecutive letters c-a in the phonetic syllable "can" are both associated with the two (2) key 114. Thus, after the letter "c" is displayed on the display 102, the user presses the pound (#) key 134 to confirm the entry of the letter c and then returns to the two (2) key 114 to enter the letter a. In situations apart from the one described above, the use of the pound (#) key 134 between letters in a word is optional. For example, once the "a" in "can" is entered, the user can immediately press the six (6) key 122 to obtain an "n" without first pressing the pound (#) key 134.

The microprocessor 220 presents on the display 102 letters associated with a selected number key depending on its frequency of occurrence following the first letter. For example, if the letter j is the first letter of a pin yin word, a valid second letter can only be a letter i or a letter u. Thus, if a user presses the five (5) key 315 and then the four (4) key 314, the display 102 will show the phonetic word "ji" in only two keystrokes. In the preferred embodiment, when only one letter associated with a keypress is valid, the microprocessor 220 will automatically cause the display 102 to show the valid letter continuously. If more than one letter associated with a single keypress is valid, the microprocessor 220 will cause the presently displayed letter to blink on the display 102 thus indicating that other valid options exist. Because the ROM 240 stores information regarding the occurrence of each letter depending on its position in a word, it can be used to direct the continuous display or blinking display of the letter.

Another method for selecting the pin yin is a predictive selection method. This method utilizes a list of pinyins. This allows for easier data entry as the user need only execute a single key press to obtain all the letters associated with that key. For example, when the nine (9) key is pressed, a vertically oriented list of the letters, w x y z is displayed in ascending order with the bottom letter field highlighted. The user then proceeds to execute a second key press to add a second letter to the pin yin. Any valid letters, conforming to the validity rules associated with the first letter presented, is displayed. In this case if the two (2) key was selected, the vertically oriented list would display a two-letter pin yin list with wa, xa, ya, za. The validity rules would eliminate the potential combination of letters from the list. The same process applies when the third letter is selected. A three-letter pin yin is formed and all valid combinations are presented in the vertically displayed pin yin list with the most commonly used pin yin displayed in the highlighted filed at the bottom of the list. For example if the third keypress is a six (6), the following pin yin list 104 in accordance with the validity rules would be wan 302, yan 304, yao 306, zan 308, zao 310. The wan pin yin 302 being highlighted 312 at the bottom of the pin yin list 104 as it is the most commonly selected pin yin from the resulting pin yin list 104.

Also shown in FIG. 3 are the characters associated with the highlighted pin yin 302 of the pin yin list 104. In FIG. 3, the highlighted area highlights the pin yin wan 302. The Chinese characters associated with wan are displayed in the matrix located below the pin yin list. The relation of the pin yin list to the matrix can be in any orientation. The current arrangement allows for use on all display and even smaller displays where only a portion of either the pin yin list or the matrix can be displayed. It may be that only one pin yin and the top row of the matrix may be displayed in the given display. Positioning the most frequently chosen pin yin at the bottom of the pin yin list and more particularly nearest the matrix allows for both the current pin yin and the characters associated with that pin yin to be displayed at the same time. As the display size increases more and more of each may be shown. For example, two pinyins may be presented along with two rows from the matrix and so on.

Figure 4:
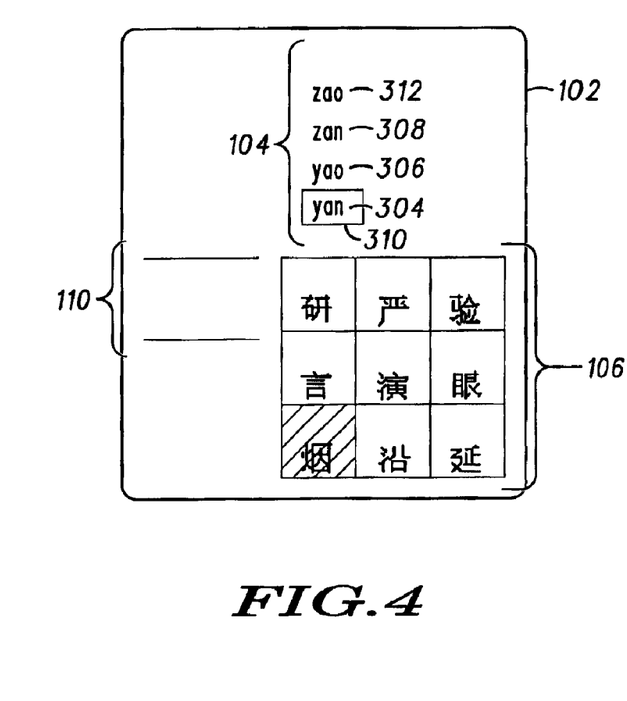
FIG. 4 is an enlarged exemplary view of a display scrolling a pin yin list.

Continuing to FIG. 4, as the user scrolls through the pin yin list 104, the list appears to move while the highlight remains stationary. This keeps the pin yin and the associated or corresponding characters visible. The arrow 402 indicates the progression of scrolling from a first pin yin 302, positioned in the highlight area 310, to FIG. 4 where the pin yin yan 304 is now positioned in the highlight area 310. The characters in the matrix 106 have also changed. The characters presented in the matrix 106 of FIG. 3 correspond to the wan pin yin 302, and the characters presented in the matrix 106 in FIG. 4 correspond to the yan pin yin 304.

Once a pin yin is displayed in the highlight are 310, characters corresponding to the highlighted pin yin are displayed in a 3×3 matrix 106 of the preferred embodiment. The 3×3 matrix 106 may be filled with nine characters or if less, if less than nine characters correspond with the given pin yin. Only those characters are displayed in the matrix and some of the space in the 3×3 matrix 106 are left blank. If more than nine characters correspond to the given pin yin, than a second page to the 3×3 matrix (not shown) will be necessary. The user will use a navigation key to move to the second page of the 3×3 matrix.

Figure 5:
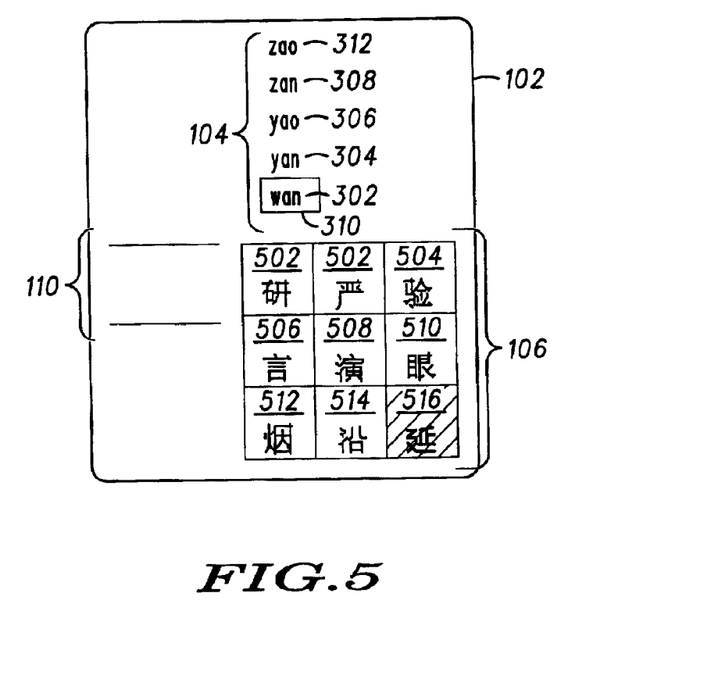
FIG. 5 is an enlarged exemplary view of a display.

Once the user enters and or scrolls to the desire pin yin, the desired character associated with the chosen pinyin can be selected. The user can use navigation keys on the keypad 108 or a joystick to move from the pinyin list to the matrix. In either case the user will need to exit pinyin entry mode and enter character selection mode because the same keys are used to select the pinyin and the characters. Because the 1 key 112 is not used it may be used to toggle between pinyin entry mode and character selection mode. Another soft key or menu key may also be used. Once in character selection mode, the user can manipulate arrow keys or a joystick to move around the matrix. FIG. 5 shows the character 518 highlighted in the matrix. The characters are highlighted as the user navigates around the matrix. When the desired character is highlighted, a selection key is depressed to select the character.

Figure 6:
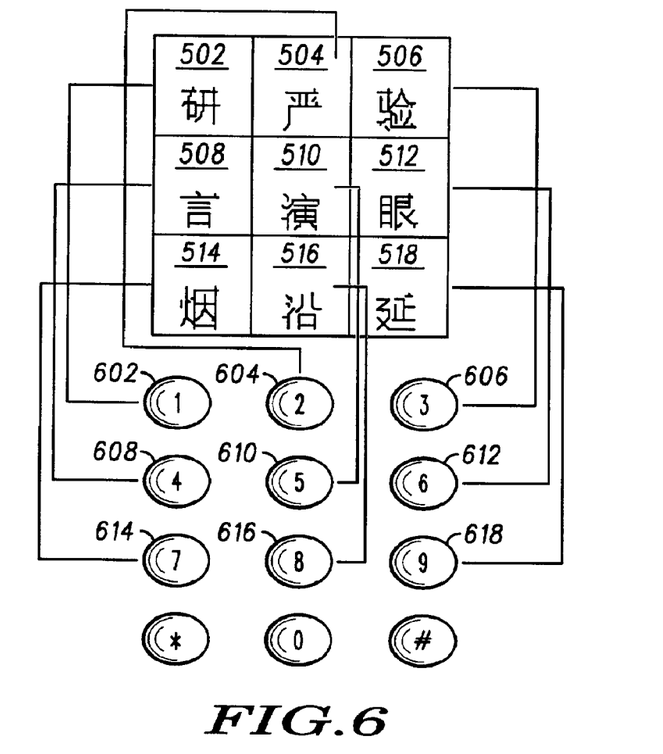
FIG. 6 is a diagram of an exemplary mapping of an entry device to a matrix on the display.
Figure 7:
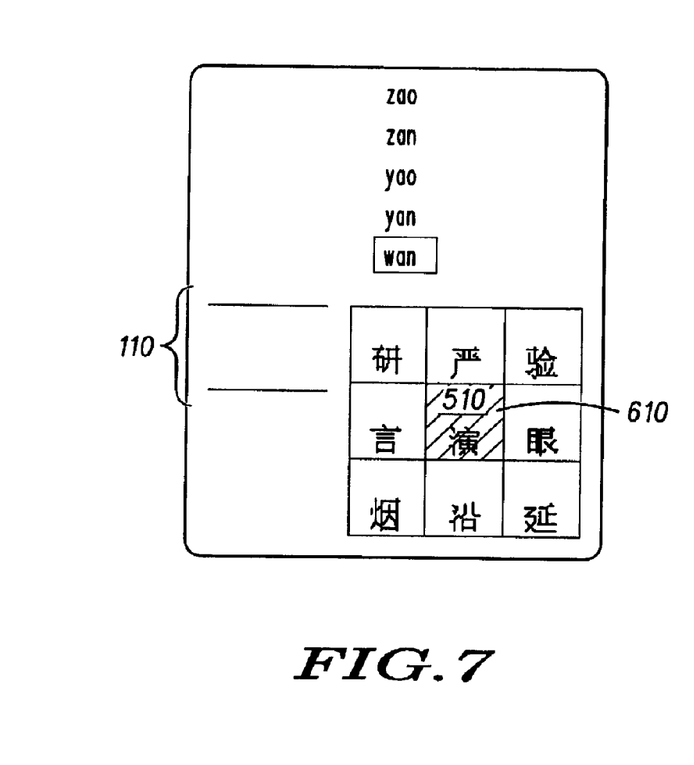
FIG. 7 is an enlarged exemplary view of a display.
Figure 8:
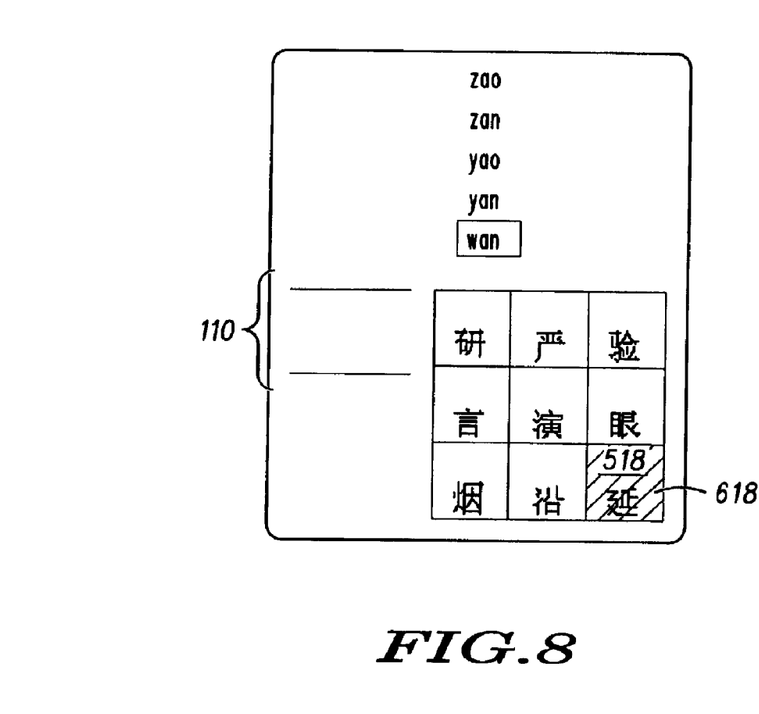
FIG. 8 is an enlarged exemplary view of a display.
Figure 9:
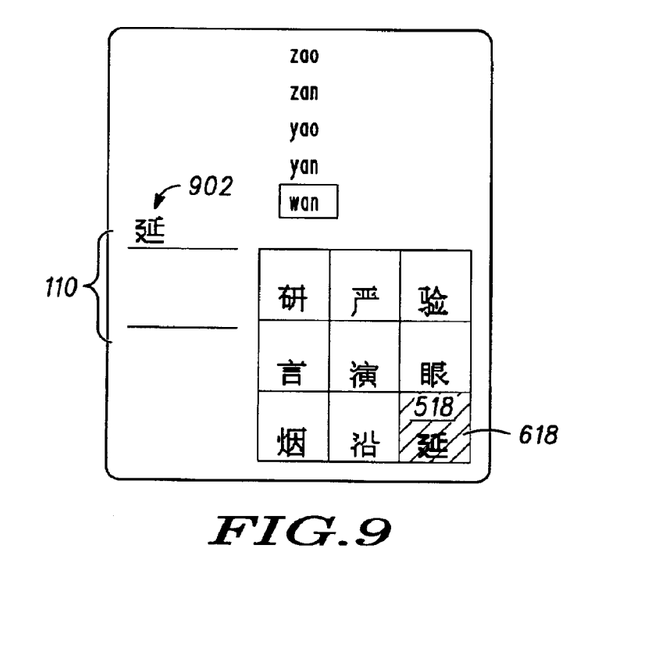
FIG. 9 is an enlarged exemplary view of a display with a character in a text field.

The preferred embodiment of the present invention maps the character matrix 106 to the keys of the keypad 108 as shown in FIG. 6. Here each key on the keypad has a corresponding position in the character matrix 106. For example, position 402 maps to the 1 key 602 on the keypad. Once the user toggles to character entry mode, it is only necessary to press the corresponding key on the keypad 108 to select the desired character. For example, if the user desires to select the character in position number 518, the nine (9) key 610 is pressed. The character, as shown in FIG. 9, is then displayed on the text lines 110.

When the phonetic syllable has been fully entered, the user has the option of selecting a tone value to indicate the tone of the syllable. Tone values can be selected using the zero (0) key 134. An alternate to the zero (0) key is the one (1) key 112, because it also does not have letters associated with it. Pressing the zero (0) key 134 once results in a first tone marker on the screen (1 or "−" depending on the implementation), pressing the zero (0) key 134 again results in a second tone marker (2 or "/") on the screen, and so on for the third tone (3 or ∨) and fourth tone (4 or \). Pressing the zero (0) key 134 five times removes the tone marker, and pressing it more than five times in succession cycles through the tones again. Preferably, the microprocessor 220 automatically skips invalid tone markers like it automatically skips invalid letters based on the information stored in the ROM 240. Thus, the number of keystrokes needed to enter a phonetic syllable and an associated tone marker can be reduced.

At any point during the phonetic syllable entry, a user can erase a roman letter or tone marker using the clear (C) key 384. After a user presses the OK key 386 to indicate that the word is completely entered, the microprocessor 220 shown in FIG. 2 initiates a search through the dictionary 244 in ROM 240 for all possible Chinese characters associated with the entered phonetic syllable. If no tone marker is entered, the microprocessor 220 will present on the display 102 all of the characters associated with the phonetic syllable alone ordered by frequency of use. If a tone marker is entered, only the characters associated with the entered phonetic syllable and tone marker are presented, again ordered by frequency of use. The eligible Chinese characters are loaded into the RAM 250 for display. In this embodiment, five Chinese characters appear on the display 102 at a time, and the user can select one of the five displayed characters using the 1-5 number keys 311–315 or scroll forward to the next set of five character alternatives using the pound (#) key 322. The star (*) key 321 also allows a user to scroll backwards through the character alternatives five at a time.

There are various validity rules depending on whether the keypress is a first letter of a word, a next letter of a word, or a tone marker. The microprocessor 220 uses the proper validity rule to determine in step 435 if a valid key has been pressed. If a valid key has not been pressed, the microprocessor 220 returns to step 410 without displaying a roman letter on the display 102 shown in FIG. 2. If a valid key was pressed, in step 440 the microprocessor 220 displays the most frequently encountered valid letter associated with the keypress on the display 102 and returns to step 410. If subsequent keypresses are presses of the same key, the microprocessor 220 will scroll through all of the valid letters associated with the key in order of priority according to the validity rules. If subsequent keypresses are different keys, the microprocessor will add roman letters or a tone marker to the word being built on the display 102.

Since more than nine characters may be associated with a given pinyin, the microprocessor 220 displays the first nine most frequently used Chinese characters in the character matrix 106. A scrolling key, such as the star (*) or pound (#) key 321, 322, or a joystick may be used to causes the next or previous nine frequently-used characters to be shown in the character matrix 106.

Figure 10:
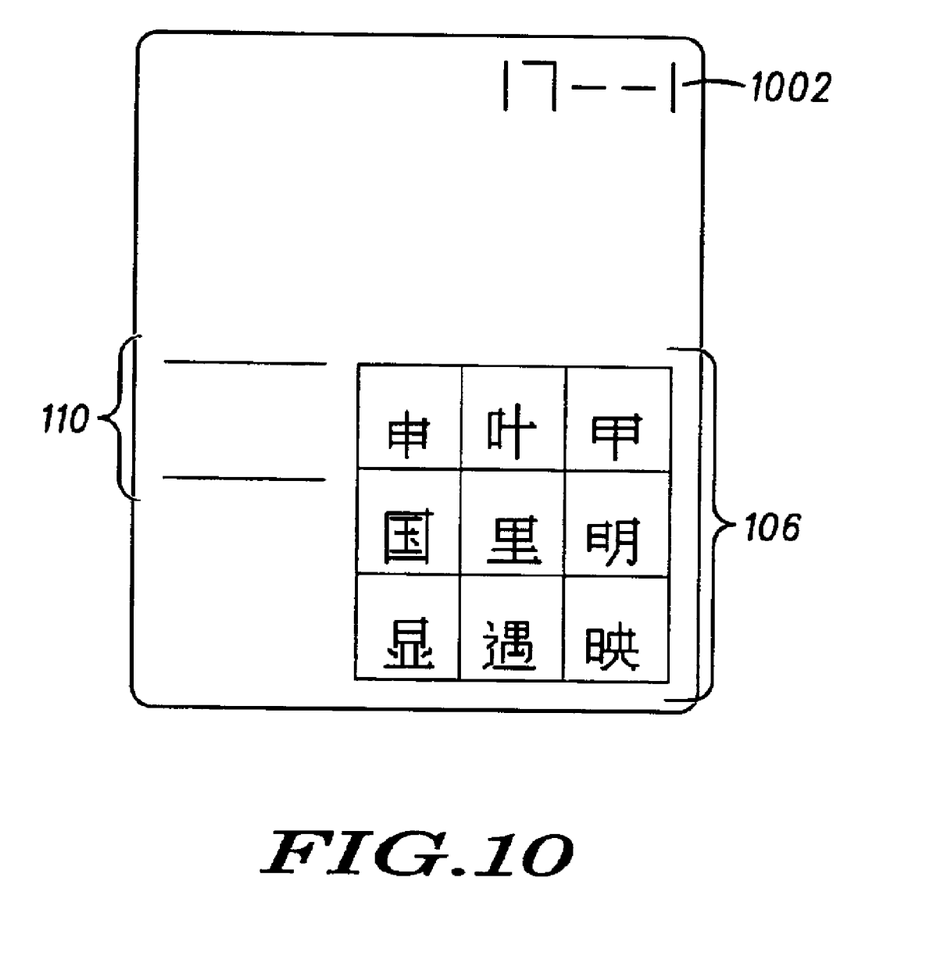
FIG. 10 is an enlarged exemplary view of a display with Character Strokes.

This reduced keypad entry apparatus and method can be used not only for pinyin word entry but also stroke entry for Chinese characters. FIG. 10 shows a Chinese character corresponding to a stroke sequence 1002 entered with the keypad in the same manner as the pinyin list 104. As the strokes are entered the possible characters associated with the stroke sequence combination are presented in the character matrix 106. The user may then toggle to the character selection mode and press the corresponding key on the keypad 108. The character is then presented on the text line 110.

Thus, the keypad entry method and apparatus provides a method and apparatus for entry of words using a small number of keypresses on a reduced keypad. The method and apparatus uses priority rules to rearrange the order of presentation of the multiple alphabet symbols associated with a single key on the keypad, automatically eliminates the presentation of invalid alphabet symbols, and allows the entry of additional information such as a tone value. The mapping of the individual keys of the keypad to the character matrix on the display allow for faster an more intuitive selection of character. While specific components and functions of the reduced keypad entry method and apparatus are described above, fewer or additional functions could be employed by one skilled in the art within the true spirit and scope of the present invention. While the invention has been described in detail above, the invention is not intended to be limited to the specific embodiments as described. It is evident that those skilled in the art may now make numerous uses, modifications of, and departures from the specific embodiments described herein without departing from the inventive concepts.

What is claimed is:

1. A method of character entry on a data entry device where at least one key is associated with multiple symbols comprising:
   receiving a keypress sequence of at least one key of said data entry device;
   displaying a first set of character combinations corresponding to said first keypress sequence of said at least one key;
   displaying a second set of characters in a 3×3 matrix, said second set of characters related to a first set of characters of said first set of character combinations;
   mapping said second set of characters in said 3×3 matrix to a 3×3 keypad; and
   selecting a character from said second set of characters in said 3×3 matrix in response to a keypress of a correspondingly mapped key of said 3×3 keypad.

2. The method of claim 1, performing the selection of a character from said second set of characters in said 3×3 matrix, in response to a keypress of a correspondingly mapped key of a 3×3 matrix portion of an alphanumeric keypad of a handheld wireless communication device.

3. The method of claim 1, displaying a third set of characters, different from said second set of characters, in a second 3×3 matrix, wherein the said third set of characters are a continuation of said second set of characters in a 3×3 matrix.

4. The method of claim 1, switching between said first set of characters and said second set of characters with a keypress.

5. The method of claim 1, navigating the positions of said matrix with a joystick, and
selecting said character with a soft key.

6. The method of claim 1, navigating the positions of said matrix with arrow keys, and
selecting said character with a soft key.

7. The method of claim 1, displaying a first pinyin list corresponding to said first keypress sequence of said at least one key wherein said pinyin list comprises at least one pinyin.

8. The method of claim 7, prioritizing said pinyin list by the frequency of pinyin selection.

9. The method of claim 7, displaying in a matrix a set of characters corresponding to said at least one pinyin.

10. The method of claim 9, presenting said pinyin list in ascending order with a highest priority pinyin at the bottom of said pinyin list.

11. The method of claim 7, wherein said second set of characters are a set of Chinese characters, associating said set of Chinese characters with a first pinyin of said pinyin list.

12. The method of claim 11, indicating that said set of Chinese characters corresponds to a highlighted pinyin by highlighting the first pinyin of said pinyin list.

13. A keypad entry apparatus comprising:
   a keypad for data entry having keys arranged in at least a 3×3 matrix;
   a display coupled to said keypad;
   a first character set displayed on said display; and
   a second character set, related to a first character of said first character set, said second character set displayed on said display in a 3×3 character matrix, wherein each character of said second character set maps to a key of said 3×3 matrix.

14. The apparatus of claim 13 wherein said first set of characters are Chinese characters.

15. The apparatus of claim 13 wherein the first set of characters are Chinese character strokes.

16. The apparatus of claim 13 wherein said first character set is a pinyin.

17. The apparatus of claim 13 wherein a key of said keypad is activated to select a character of said first character set.

18. The apparatus of claim 13 wherein said pinyin list is located above said 3×3 character matrix.

19. A method of character entry on a data entry device where at least one key is associated with multiple symbols comprising:
   pressing a first key sequence on said data entry device, said first key sequence generating a first pinyin list;
   displaying said first pinyin list on a display of said data entry device;
   highlighting a first pinyin of said first pinyin list;
   displaying a first character set, wherein said first character set is arranged in a first 3×3 character matrix, said first character set associated with said highlighted first pinyin, wherein said 3×3 character matrix maps to a keypad of said data entry device.

20. The method of claim 19, prior to the step of displaying said first character list, moving by scrolling said first pinyin list through a pinyin highlight, such that the first pinyin list moves and the pinyin highlight remains stationary.

21. The method of claim 19, displaying said first pinyin list in a vertical column.

22. The method of claim 21, prioritizing each pinyin based on a frequency of selection.

23. The method of claim 21, prioritizing each pinyin of said first pinyin list.

24. The method of claim 23, displaying said first pinyin list in an ascending order of priority from bottom to top.

25. The method of claim 23, highlighting a highest priority pinyin at the bottom of said vertical column.

26. A method of character entry on a data entry device comprising:
- displaying a first set of characters in response to a first input sequence of at least one key of said data entry device;
- displaying a second set of characters in a matrix in response to displaying said first set of characters, said second set of characters related to a first character of said first set of characters;
- mapping said second set of characters in said matrix to a keypad.

27. The method of claim 26, selecting a character from said second set of characters in said matrix by depressing a correspondingly mapped key of said keypad.

28. The method of claim 26, displaying said second set of characters in a 3×3 matrix.

29. The method of claim 26, displaying a first set of strokes in response to a first input sequence of said at least one key.

30. The method of claim 26, displaying a pinyin list in response to a first input sequence of said at least one key.

31. The method of claim 30, displaying a second set of characters in a matrix in response to displaying said pinyin list, said second set of characters related to a first pinyin of said pinyin list.

* * * * *